(12) United States Patent
Johnson, Sr. et al.

(10) Patent No.: US 11,976,779 B2
(45) Date of Patent: *May 7, 2024

(54) TRIPOD WITH A SEALED LEG LOCK

(71) Applicant: Really Right Stuff, LLC, Lehi, UT (US)

(72) Inventors: Joseph M. Johnson, Sr., Lehi, UT (US); Matthew L Burk, Lehi, UT (US); Verent Chan, Lehi, UT (US)

(73) Assignee: Really Right Stuff, LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,808

(22) Filed: May 19, 2023

(65) Prior Publication Data
US 2023/0288017 A1 Sep. 14, 2023

Related U.S. Application Data

(63) Continuation of application No. 17/352,031, filed on Jun. 18, 2021, now Pat. No. 11,698,163, which is a continuation of application No. 16/595,082, filed on Oct. 7, 2019, now Pat. No. 11,067,216.

(60) Provisional application No. 62/864,365, filed on Jun. 20, 2019, provisional application No. 62/826,623, filed on Mar. 29, 2019, provisional application No. 62/788,256, filed on Jan. 4, 2019.

(51) Int. Cl.
*F16M 11/00* (2006.01)
*F16M 11/32* (2006.01)

(52) U.S. Cl.
CPC ....... *F16M 11/32* (2013.01); *F16M 2200/027* (2013.01)

(58) Field of Classification Search
CPC .. F16M 11/32; F16M 2200/027; F16M 11/16; F16B 7/149
See application file for complete search history.

(56) References Cited

U.S. PATENT DOCUMENTS

| | | | | |
|---|---|---|---|---|
| 4,648,697 A | * | 3/1987 | Kawazoe | F16M 13/00 396/419 |
| 5,404,280 A | * | 4/1995 | Greek | F21V 33/008 362/802 |
| 8,915,476 B2 | * | 12/2014 | Nakatani | G03B 17/561 248/163.1 |
| 9,989,190 B2 | * | 6/2018 | Torbitt | F16M 11/32 |
| 10,288,196 B2 | | 5/2019 | Hu | |
| 10,352,344 B2 | | 7/2019 | Muirhead | |
| 11,067,216 B2 | | 7/2021 | Johnson, Sr. et al. | |

(Continued)

FOREIGN PATENT DOCUMENTS

| | | |
|---|---|---|
| CN | 201628064 U | 11/2010 |
| CN | 201651699 U | 11/2010 |

(Continued)

OTHER PUBLICATIONS

Ephotozine, Review of Gitzo Ocean Traveler Series 1 Carbon Fiber Tripod, Aug. 22, 2012, 1 page, https://www.ephotozine.com/article/gitzo-ocean-traveler-series-1-carbon-fibre-tripod-review-19881.

(Continued)

*Primary Examiner* — Amy J. Sterling
(74) *Attorney, Agent, or Firm* — Chernoff, Vilhauer, McClung & Stenzel LLP

(57) ABSTRACT

A locking mechanism for a tripod.

19 Claims, 22 Drawing Sheets

(56) References Cited

U.S. PATENT DOCUMENTS

| | | | |
|---|---|---|---|
| 11,221,544 B1* | 1/2022 | York | F16M 11/24 |
| 2009/0072100 A1* | 3/2009 | Zierer | F16M 11/28 248/169 |
| 2013/0313384 A1 | 11/2013 | Nakatani | |
| 2016/0169420 A1 | 6/2016 | Hu | |
| 2019/0078728 A1* | 3/2019 | Wilson | F16B 7/1463 |
| 2020/0217447 A1 | 7/2020 | Johnson, Sr. et al. | |
| 2021/0310606 A1 | 10/2021 | Johnson, Sr. et al. | |
| 2022/0205584 A1* | 6/2022 | Christensen | F16M 11/16 |

FOREIGN PATENT DOCUMENTS

| | | |
|---|---|---|
| CN | 204371851 U | 6/2015 |
| CN | 104454841 B | 6/2016 |

OTHER PUBLICATIONS

Gitzo, "Ocean Traveler" tripod images, 2012, 8 pages.

* cited by examiner

TRIPOD WITH A SEALED LEG LOCK

CROSS-REFERENCE TO RELATED APPLICATIONS

This application is a continuation of U.S. patent application Ser. No. 17/352,031, filed Jun. 18, 2021, which is a continuation of U.S. patent application Ser. No. 16/595,082 filed Oct. 7, 2019, now U.S. Pat. No. 11,067,216, issued Jul. 20, 2021, which claims the benefit of U.S. Provisional Patent Application No. 62/788,256 filed Jan. 4, 2019, U.S. Provisional Patent Application No. 62/826,623 filed Mar. 29, 2019, and U.S. Provisional Patent Application No. 62/864,365 filed Jun. 20, 2019, which are incorporated herein by reference.

BACKGROUND OF THE INVENTION

The present invention relates to a portable support apparatus for equipment, such as a tripod, with a sealed leg lock. For convenience, the term "tripod" is used as a generic identifier for a more broad class of equipment supports, which may have any number of legs, e.g., a support with one, two, three, four or more legs.

Tripods have been used for many years. Typically, tripods include an elevated mounting surface, upon which equipment may be secured, such as a camera, telescope, musical equipment, surveying equipment, antenna, etc. The elevated mounting surface is supported by a plurality of legs, which in the case of a tripod is typically three. Other numbers of legs may likewise be used, such as a single leg monopod.

Tripods are designed to provide some optimal balance between a set of features. For example, one feature of a tripod is stability, as it is often desirable to insure that shaking or other movement of equipment supported by the tripod is minimized so that, for example, blur does not occur in an image taken by a camera supported on the tripod. Tripods are often used portably, hence, it is often desired to minimize the weight and/or dimensions of the tripod so that it may be carried over great distances. Also, it is often desirable to include a locking mechanism between different segments of the legs that are efficient to operate while being suitable for use in hostile environments, such as sandy environments and ocean environments.

Many existing tripods are vertically collapsible with radially extendible legs. For example, a tripod may have three leg assemblies, with each leg assembly pivotally connected to the elevated equipment support so that each leg may be pivoted outwards when in use, and inwards when not in use. Also, each leg assembly may have multiple elements that selectively slide axially relative to each other. For example, a multi-stage tripod may have first, second, and third segments for each leg. To adjust the height of the tripod, the first and second leg segments are slidably movable relative to each other and the second and third leg segments are also slidably movable relative to each other. Each pair of legs may be selectively locked and unlocked at different positions. Tripods also may include an adjustable central column to change the height at which equipment is supported by the tripod at a fixed extension of the tripod legs. Further, the tripod legs typically include locking detents so that each of the tripod legs may be positioned at one of a plurality of fixed angular orientations. The telescopic tube structure may comprise an outer tube, an inner tube elastically sleeved by the outer tube, and a locking structure for locking two adjacent connection tubes into an integral piece.

The telescopic tubes are usually used on tripods of photographic equipment. A foot tube of a tripod is usually in the form of a telescopic tube, in order to provide a watertight locking structure of the foot tube. Chinese patent CN201651699U discloses a locking waterproof structure of leg tubes, comprising a threaded sleeve tube, a rubber sleeve, a locking part, and a locking knob component. The upper portion of the threaded sleeve tube is connected with an upper tube of a tripod leg tube. A holding cavity with the opened lower end is formed between the lower portion of the threaded sleeve tube and a lower tube of the tripod leg tube. The locking part is sleeved onto the lower tube and arranged in the holding cavity. The rubber sleeve is sleeved on the upper portion of the threaded sleeve tube. The locking knob component comprises a lock ring sleeve and a rubber part coated outside the lock ring sleeve. The lock ring sleeve is fittingly connected with the threaded sleeve tube in a thread manner and the bottom end of the rubber part is provided with a rubber part converging portion which is in interference fit with the lower tube. The thickness of the rubber sleeve meets the requirement that the upper end of the inner wall of the lock ring sleeve and the outer wall of the rubber sleeve are in interference fit after the rubber sleeve is locked through rotating the locking knob component. The waterproof of the lower end of the locking waterproof structure of leg tubes is achieved by providing a rubber sleeve at the lower end face of the lock ring sleeve, the sealing between the locking ring sleeve and the lower tube is achieved by the interference fit between the rubber part converging portion and the lower tube, during the telescopic adjustment between the upper tube and the lower tube. The rubber part converging portion is easy to be abraded, therefore the interference fit is easy to be destroyed, which eventually affects the sealing between the rubber part and the lower tube, thus, leads to a poor waterproof effect, besides, the exposed rubber part may lead to an external abrasion and corrosion, even can be peeled off from the end face, so that the waterproof performance of the locking structure is affected and even lost.

Unfortunately, in dirty and/or salty water conditions fouling tends to decrease the lockup available with the locking mechanism.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
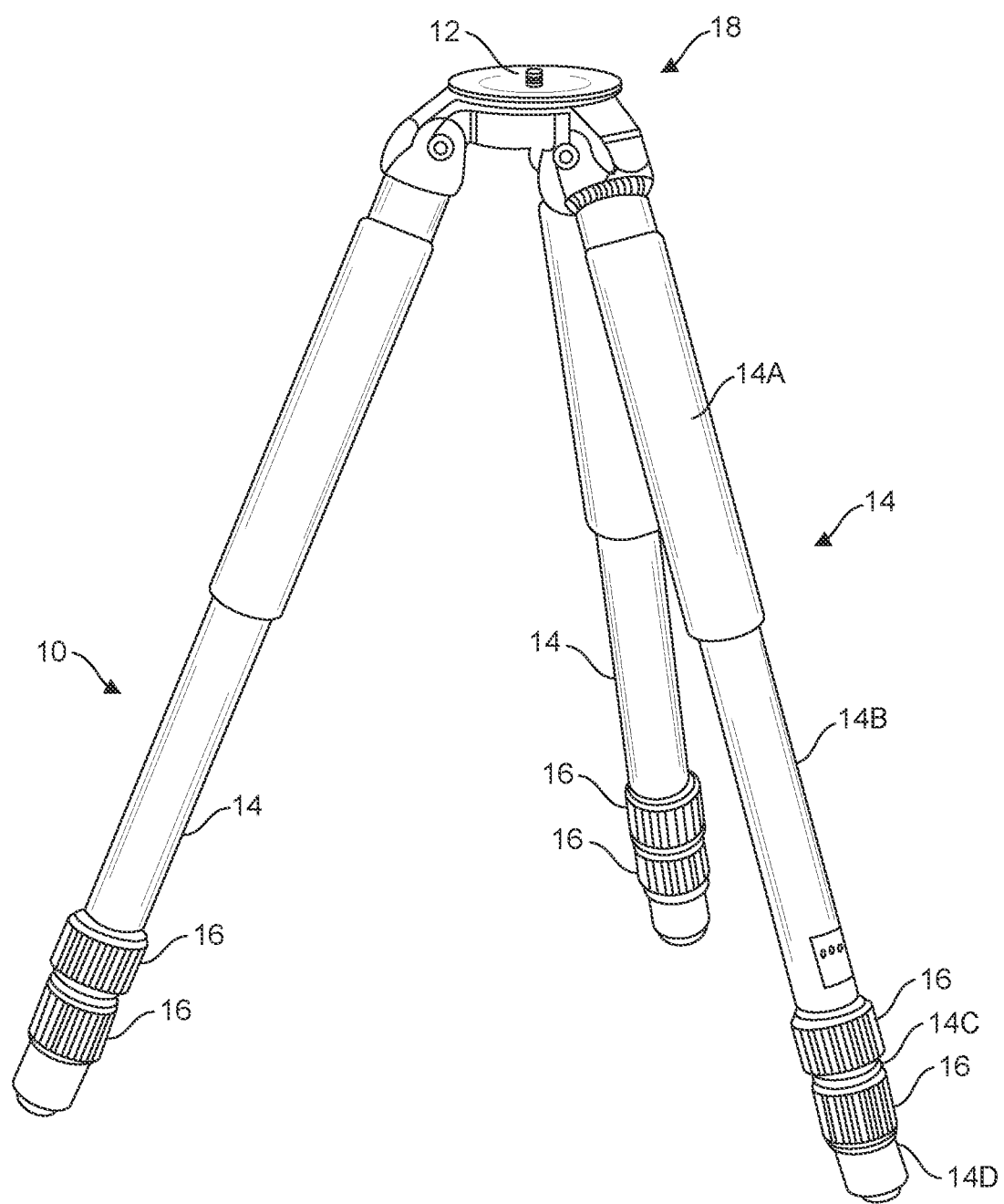
FIG. 1 illustrates a tripod.

FIG. 1 shows an exemplary generic tripod 10. Though features are discussed in reference to the depicted tripod, it should be understood that the features may be implemented in an equipment support having any number of legs (or leg). The tripod 10 may include a platform 12 for detachably securing equipment to the tripod 10 using a set screw or other attachment mechanism. The tripod 10 may include a plurality of legs 14 to support the platform 12 at an elevated position. The platform 12 may be detachably mounted within an apex 18 of the tripod, which may be a ring into which the platform 12 may be secured. Each of the legs 14 may include a plurality of telescoping leg sections 14A, 14B, 14C and 14D, that nest together in a retracted position by releasing an appropriate locking mechanism 16. Although the platform 12 is shown as having a fixed vertical position with respect to the apex 18, it is understood that the platform 12 may be supported by a vertically-extensible column movably (e.g. slidably) engaged with the apex 18. The platform 12 may include a spirit level. Each of the legs 14 preferably pivots about a respective axis proximate the apex 18. Through a selective choice of respective angles between each of the legs 14 and the apex 18, along with a desired telescoped length of each respective leg, equipment attached to the tripod 10 may be supported on a wide variety of terrain.

Figure 2:
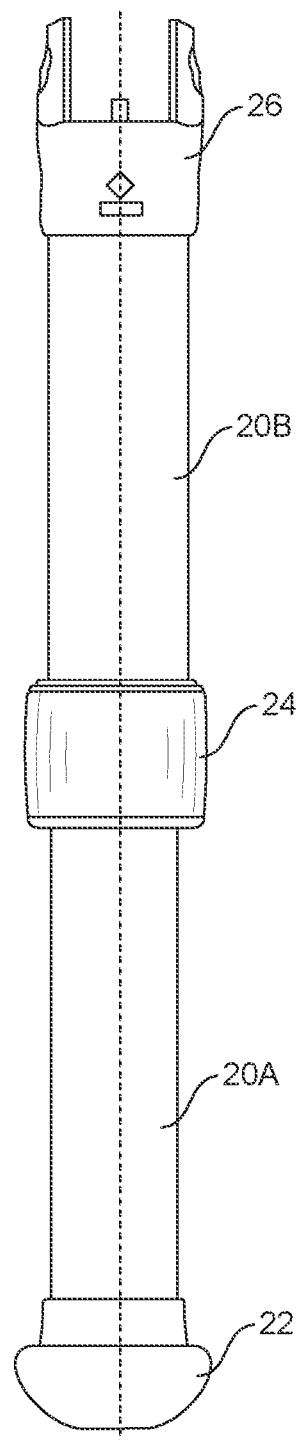
FIG. 2 illustrates a pair of leg segments in an extended position.

FIG. 2 illustrates a tripod leg with two leg sections 20A, 20B that nest together with one another. Each of the two leg sections 20A, 20B are preferably centrally axially aligned with one another. The end of leg section 20A may include a foot 22, having any suitable structure, such as a crenated foot, a spike, or a rounded end. The two leg sections 20A, 20B are adjustably slidably secured together by the locking mechanism 24. By rotation of the locking mechanism 24 in a first direction, the leg sections 20A, 20B may be readily slid with respect to one another. By rotation of the locking mechanism 24 in a second direction, opposite the first direction, the leg sections 20A, 20B are inhibited from being readily slid with respect to one another. The end of leg section 20B may include a leg yoke 26 that is movably attached to the apex 18.

Figure 3:
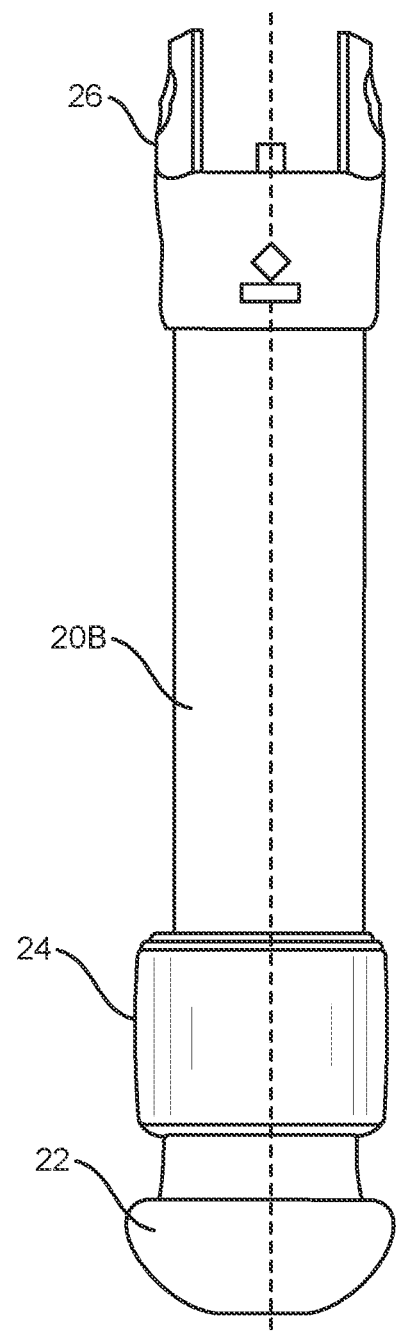
FIG. 3 illustrates a pair of leg segments in a retracted position.

FIG. 2 illustrates the two leg sections 20A and 20B in a generally extended position, and may be inhibited from being readily slid with respect to one another using the locking mechanism 24. FIG. 3 illustrates the two leg sections 20A and 20B in a generally retracted position, and may be inhibited from being readily slid with respect to one another using the locking mechanism 24. Intermediate positions of the two leg sections 20A and 20B may likewise be selected and secured, as desired, using the locking mechanism 24.

Figure 4:
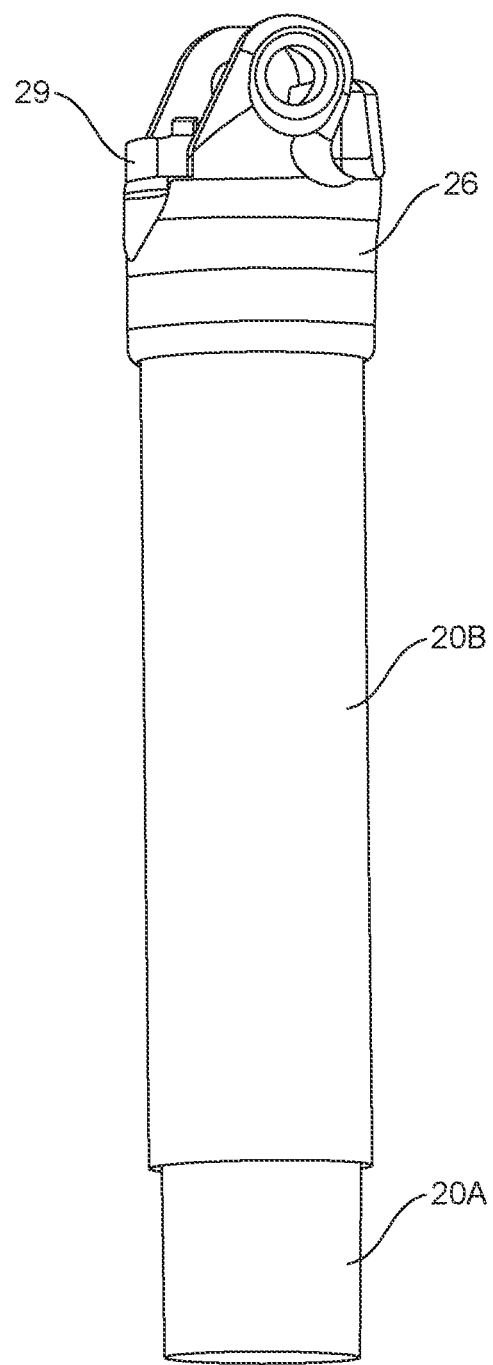
FIG. 4 illustrates a partial view of a leg segment with a leg yoke.

Referring to FIG. 4, a partial view of FIG. 3, illustrates the two leg sections 20A and 20B, together with the leg yoke 26 with the locking mechanism 24 not shown. A pull tab 29 is illustrated, together with an appropriate spring mechanism (not shown), which is used for a ratcheting mechanism for securing the leg at different angular orientations with respect to the apex 16.

Figure 5:
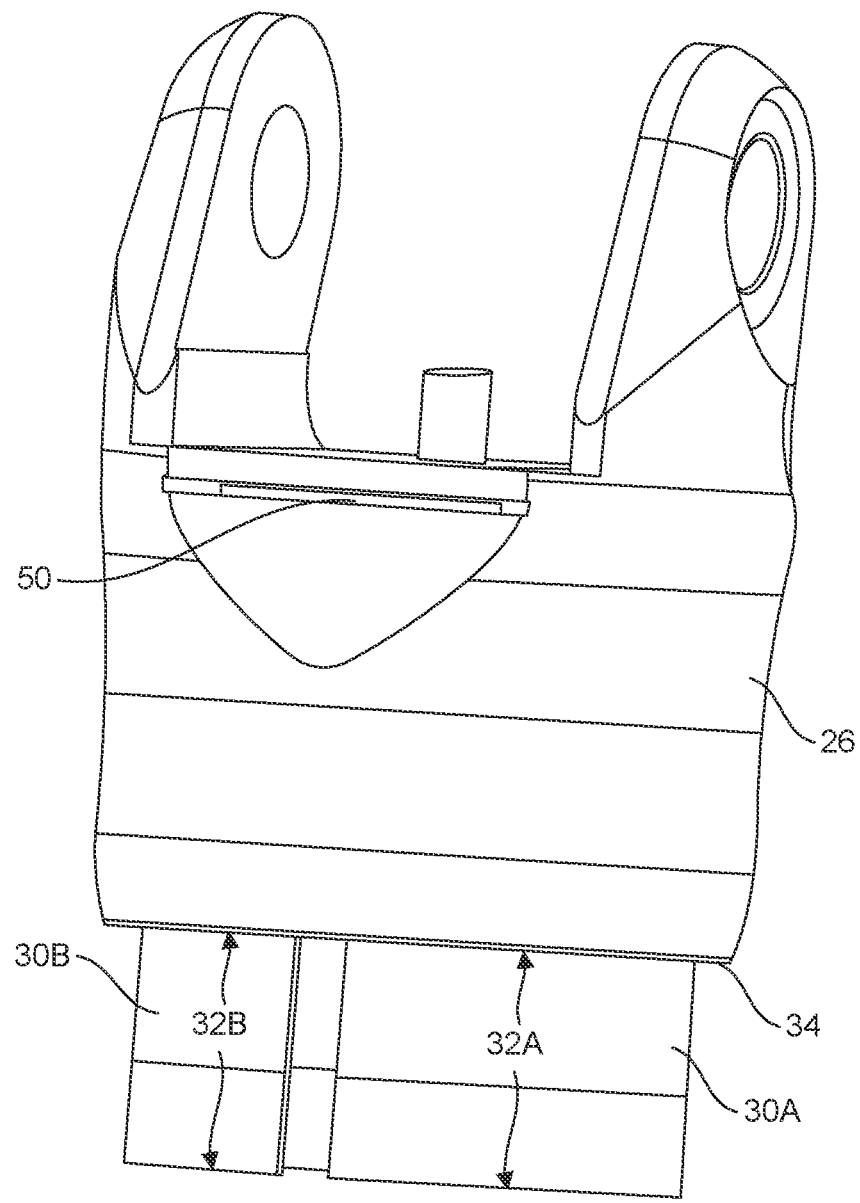
FIG. 5 illustrates a leg yoke and pair of sleeves.

Referring also to FIG. 5, the leg yoke 26 is illustrated together with a pair of anti-twist sleeves 30A and 30B. The pair of anti-twist sleeves 30A and 30B fit within the interior of the tube a substantial distance, being in face-to-face engagement with the interior surface of the tube, where the tube is bonded to the leg yoke 26. The pair of anti-twist sleeves 30A and 30B may also extend a substantial distance 32A and 32B external to a lower portion 34 of the leg yoke 26.

Figure 6:
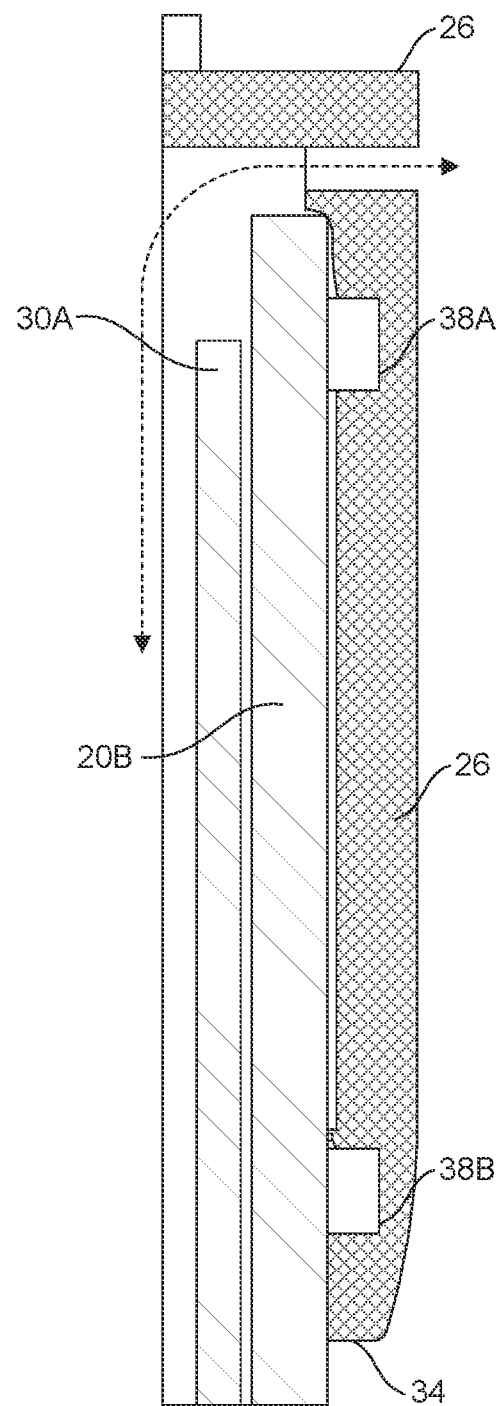
FIG. 6 illustrates a cross sectional view of the upper portion of the leg segment and leg yoke.

Referring also to FIG. 6, the pair of anti-twist sleeves 30A and 30B are in face-to-face engagement with the interior of the leg section 20B. The interior surface of the leg yoke 26 may include a pair of spaced apart recessed portions 38A and 38B, which act as adhesive injection spillover chambers, that preferably extend around the entire interior periphery in a ring-like fashion, to secure the leg section 20B to the leg yoke 26. The spacing between the anti-twist sleeves, which are preferably slightly flexible, assist in removal and insertion of the anti-twist sleeves within the leg yoke 26 and leg section 20B.

When the two leg sections 20A and 20B are extended or retracted the amount of space enclosed therein tends to increase or decrease, respectively. With the two leg sections 20A and 20 substantially sealed by the foot 22, the locking mechanism 24, and the yoke 26, it is desirable to include an opening defined therein to permit a free-flow of air to adjust the pressure of the air enclosed by the two leg sections 20A and 20B. Referring to FIG. 5 and to FIG. 6, a slit 50 may be defined by the yoke 26 that extends from the interior of the yoke 26, which is in fluid communication with the interior of the leg sections 20A and 20B, to the exterior of the yoke 26, which is in fluid communication with the external environment. The slit 50 may be any suitable type of opening and/or passage defined by the yoke 26, or the yoke 26 in combination with other structures. With the slit 50 being located just below the apex, and hence high away from likely sources of fouling, such as dirt and salt water, reduces the likelihood of damage to the tripod from such fouling. The slit 50 permits air exchange between the interior and the exterior of the two leg sections 20A and 20B, permitting the leg sections to more freely move without significant backpressure. In addition, while the slit 50 may be forwardly facing, it is preferably rearwardly facing so that it directs air away from a ratcheting pull tab mechanism, which tends to include relatively high tolerance components that may be rendered inoperable if occasionally sprayed with wet, salty air, from inside the two leg sections 20A and 20B.

Figure 7:
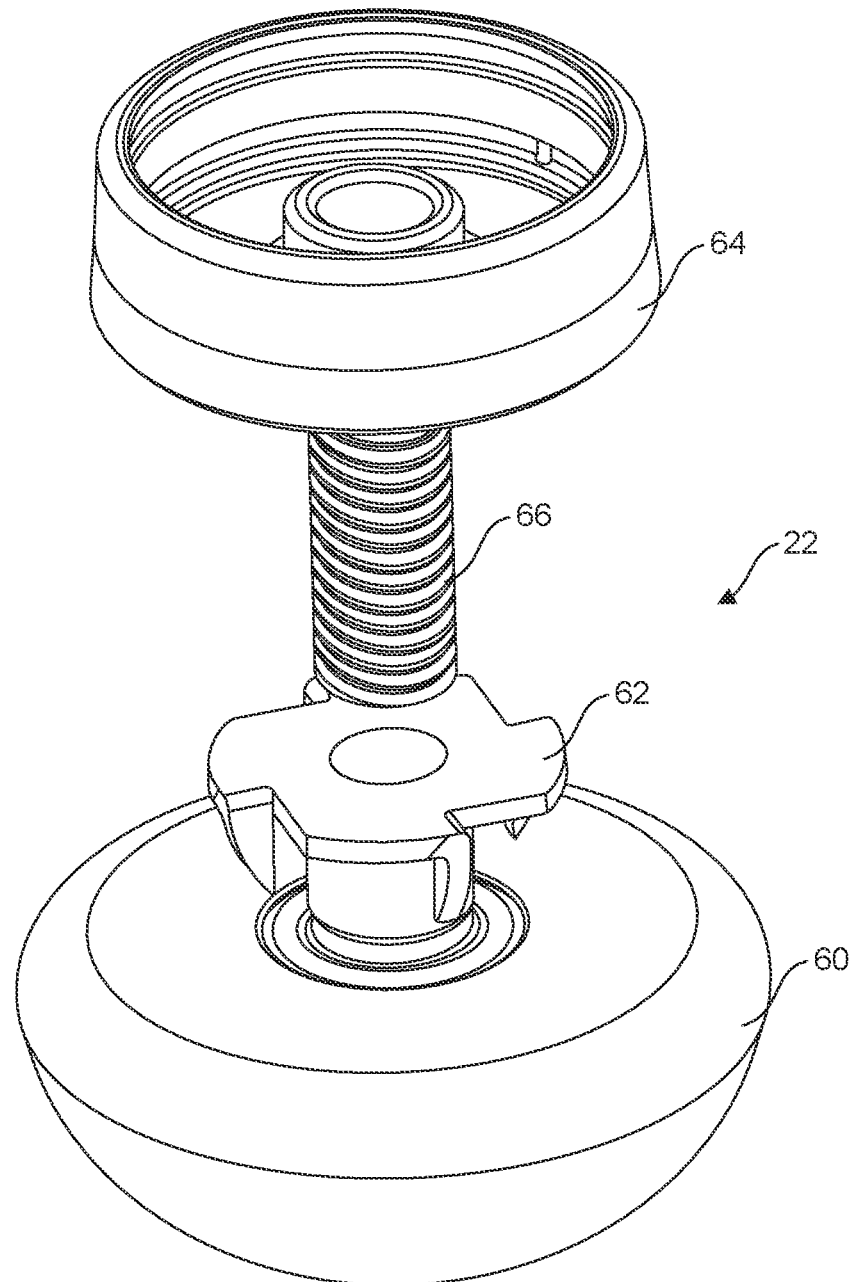
FIG. 7 illustrates a foot for a leg segment.
Figure 8:
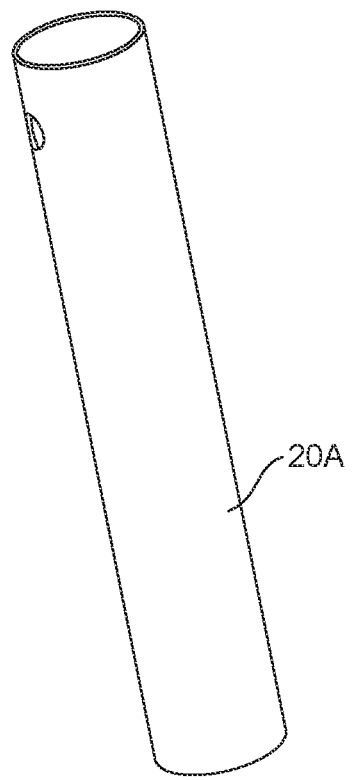
FIG. 8 illustrates the foot of FIG. 7 together with the leg segment.
Figure 8:
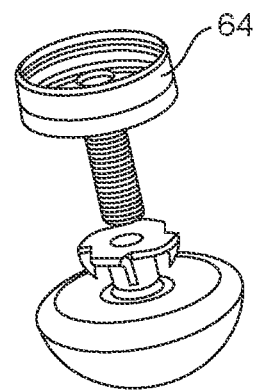
Figure 9:
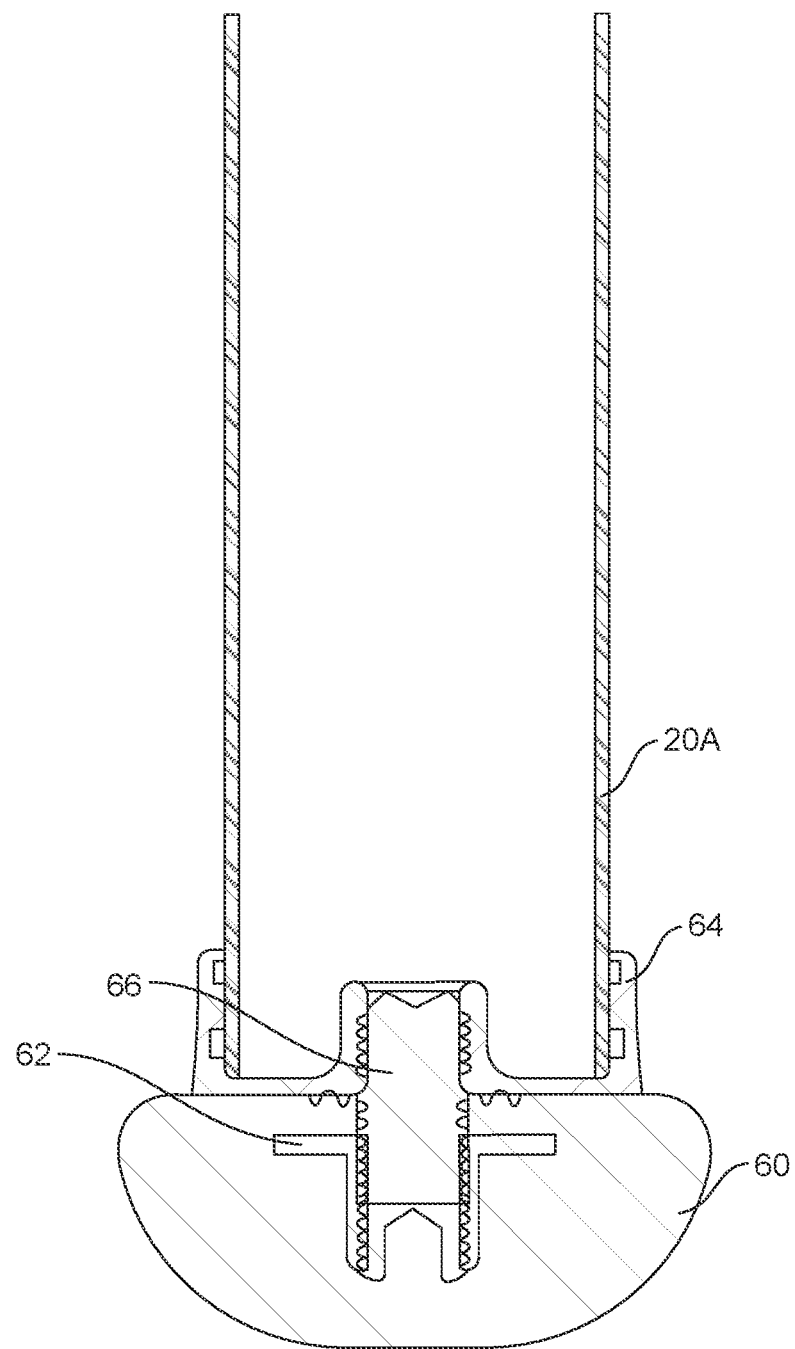
FIG. 9 illustrates a cross sectional view of the foot and leg segment of FIG. 8.

Referring to FIG. 7, the foot 22 may include a bowl foot 60. The bowl foot 60 preferably has a bowl shaped exterior surface, but may include any other type of shape, such as a spike or a ring. The foot 22 may include a tee nut with 4 prongs 62, which may be detachably engaged with the bowl foot 60. The tee nut 62 may be detachably engaged with a tripod foot receiver 64 using a set screw 66, which may be threadably engaged with threads in the foot 22 using the set screw 66, passing through the tee nut 62. Referring also to FIG. 8, the leg segment 20A may be engaged with a tripod foot receiver 64 with the lower portion thereof of the leg segment 20A in face-to-face engagement with the interior surface of the tripod foot receiver 64, as shown in FIG. 9. It is noted that the foot together with the leg segment forms a structure that is completely sealed which prohibits fluids to enter or to exit the lower portion of the tripod leg.

Figure 10:
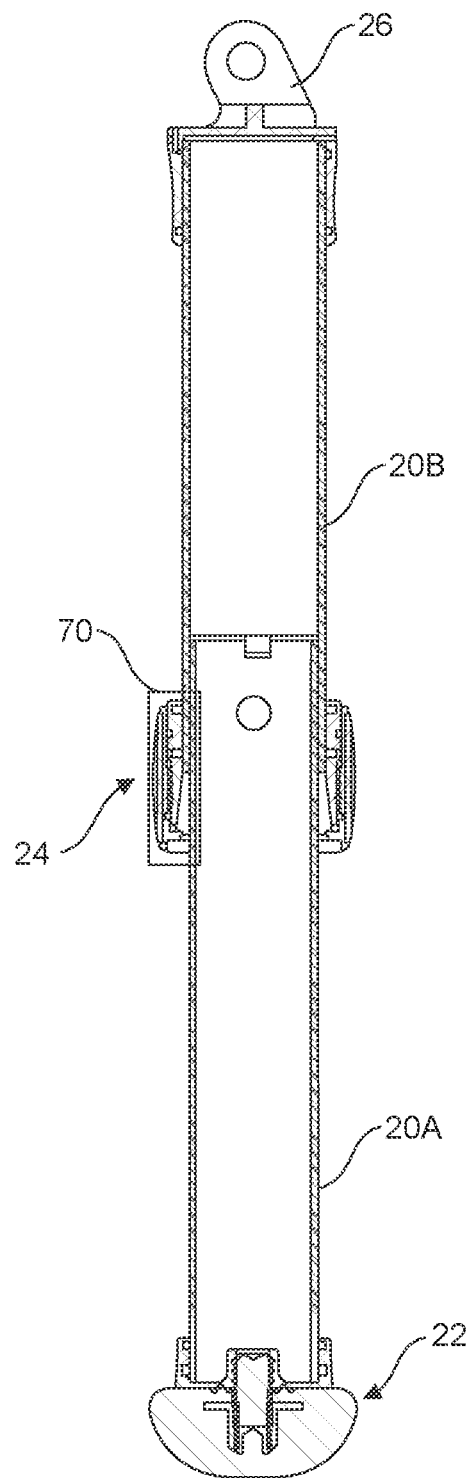
FIG. 10 illustrates a cross sectional view of the leg segment, the foot, a locking member, and the leg yoke.
Figure 11:
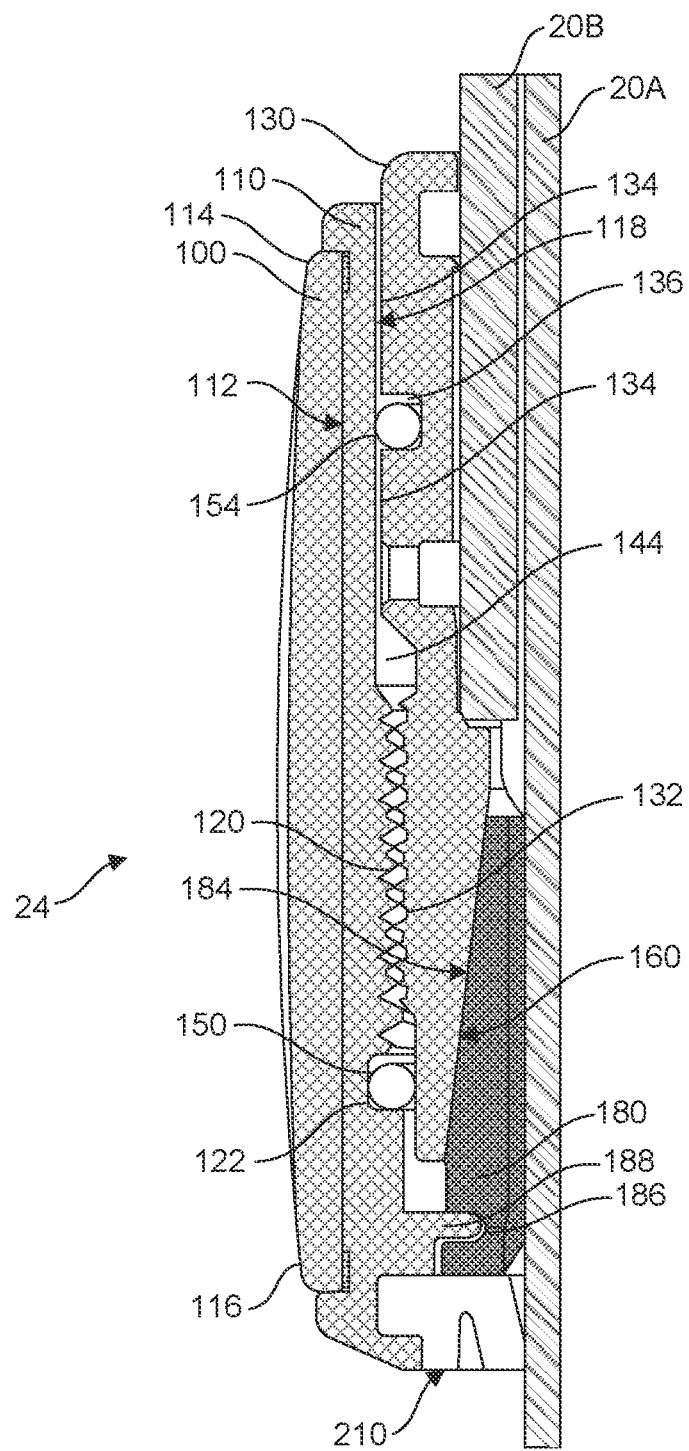
FIG. 11 illustrates a cross sectional view of the locking member.
Figure 12:
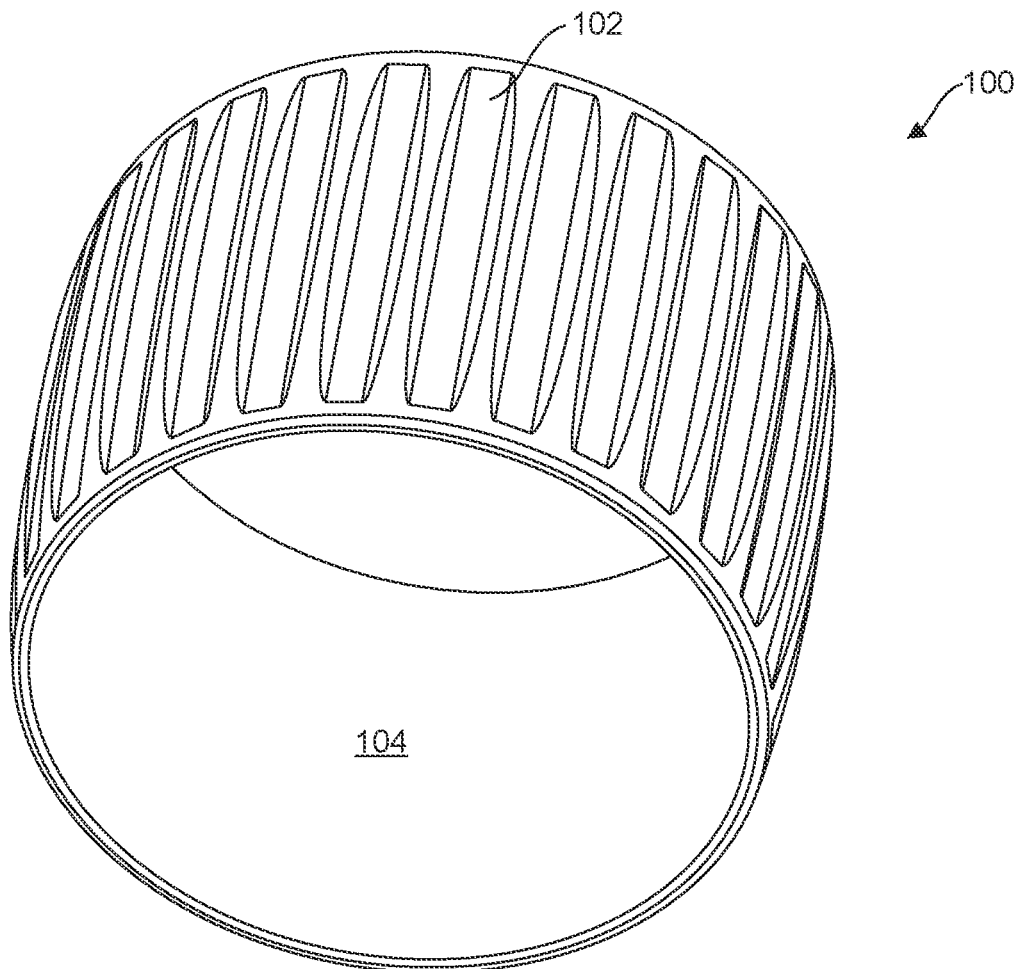
FIG. 12 illustrates a pictorial view of a knob tread of the locking member.

Referring to FIG. 10, a cross sectional view of a leg assembly is shown with the foot 22, the two leg segments 20A and 20B in a generally extended position, the locking mechanism 24, and the yoke 26. Referring to FIG. 11, an enlarged view of a portion 70 of the locking mechanism 24 is illustrated. The locking mechanism 24 encircles the two leg sections 20A and 20B and by rotation of a knob tread 100 (see FIG. 11) in a first direction, the two leg sections 20A and 20B are inhibited from sliding with respect to one another, and by rotation of the knob tread 100 (see FIG. 11) in a second direction opposite the first direction, the two leg sections 20A and 20B are released from being inhibited from sliding with respect to one another. Referring to FIG. 12, the knob tread 100 may include a set of raised ribs 102 for a better grip by the user. The interior surface 104 of the knob tread 100 is preferably molded over a heavily knurled surface of an exterior surface 112. Preferably, the knob tread 100 is a flexible rubberized material.

Figure 13:
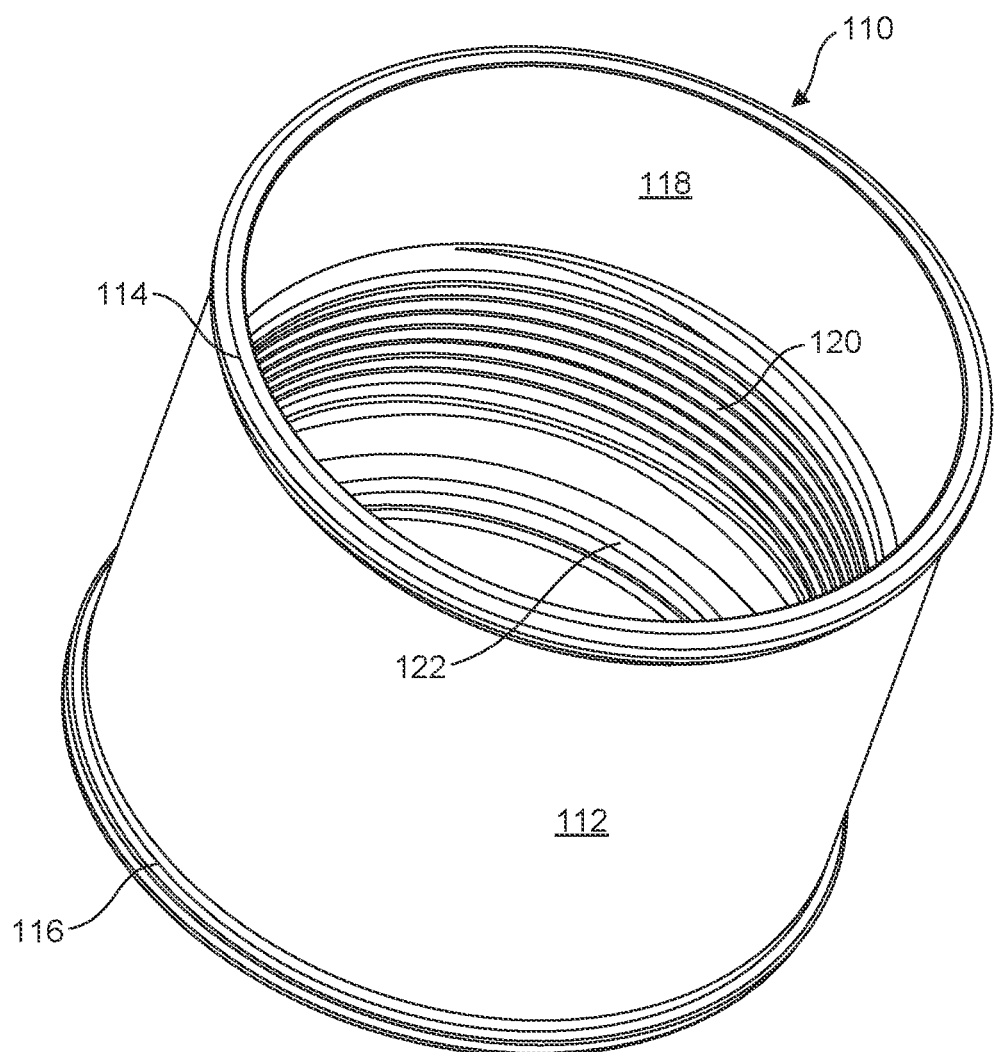
FIG. 13 illustrates a pictorial view of a knob substrate of the locking member.
Figure 14:
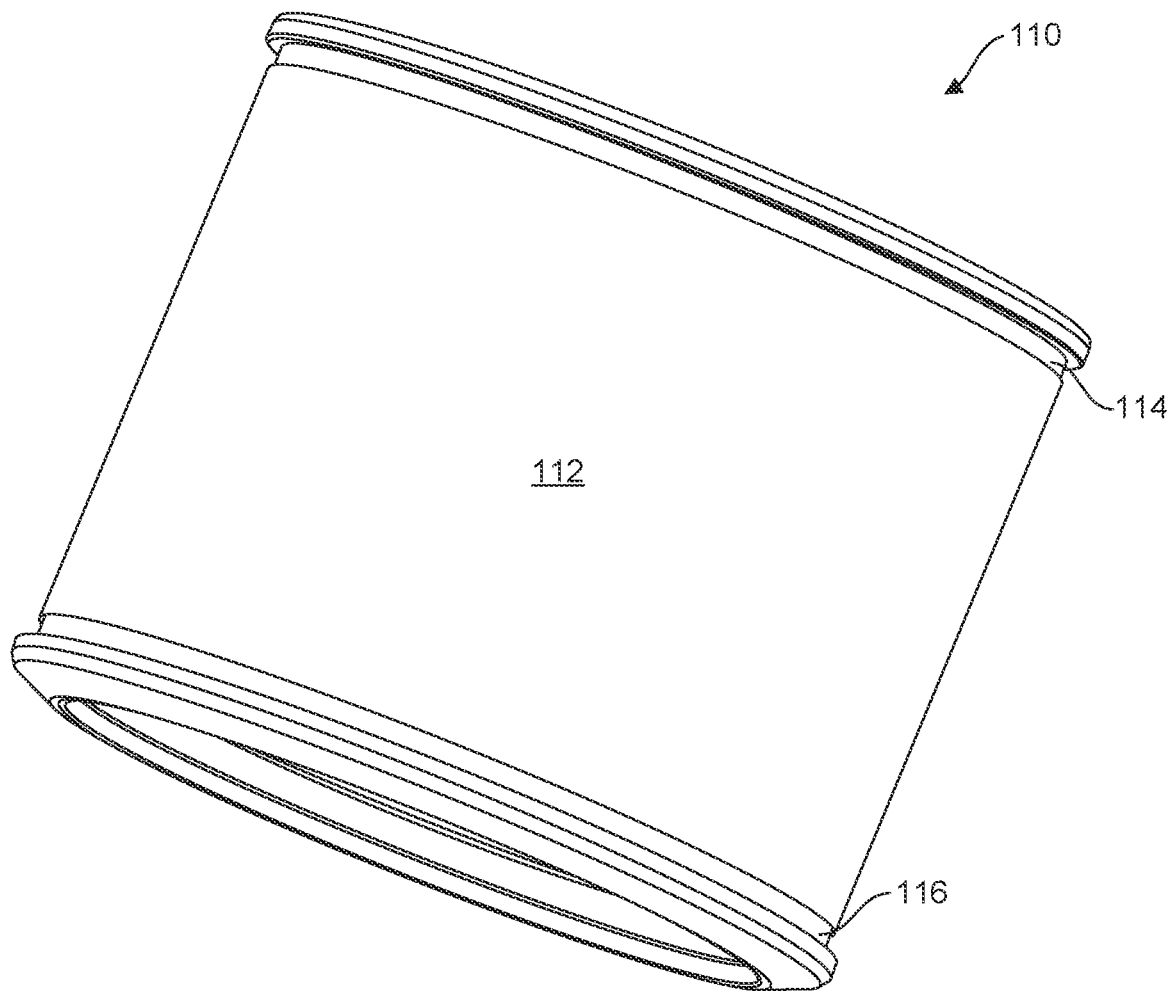
FIG. 14 illustrates another pictorial view of the knob substrate of the locking member.

Referring also to FIG. 13 and FIG. 14, the locking mechanism 24 includes a knob substrate 110. The knob substrate 110 includes the exterior surface 112 thereof that defines a pair of grooves 114 and 116. The shoulders 114 and 116 serve as shutoff seals for the tread over-molding process and also as axial external retainers for the tread 100 once molded. Also, the knob tread 100 includes a solid shoulder that is fully recessed within the pair of shoulders 114 and 116. The knob substrate 110 may include an internal surface 118 that defines a set of threads 120. The threads are engaged with threads 132 defined by a collet ramp 130. The knob substrate 110 may define a back circular recess 122 that is sized to receive a back O-ring 150 that is slightly larger in depth and/or width than the back circular recess 122.

Figure 15:
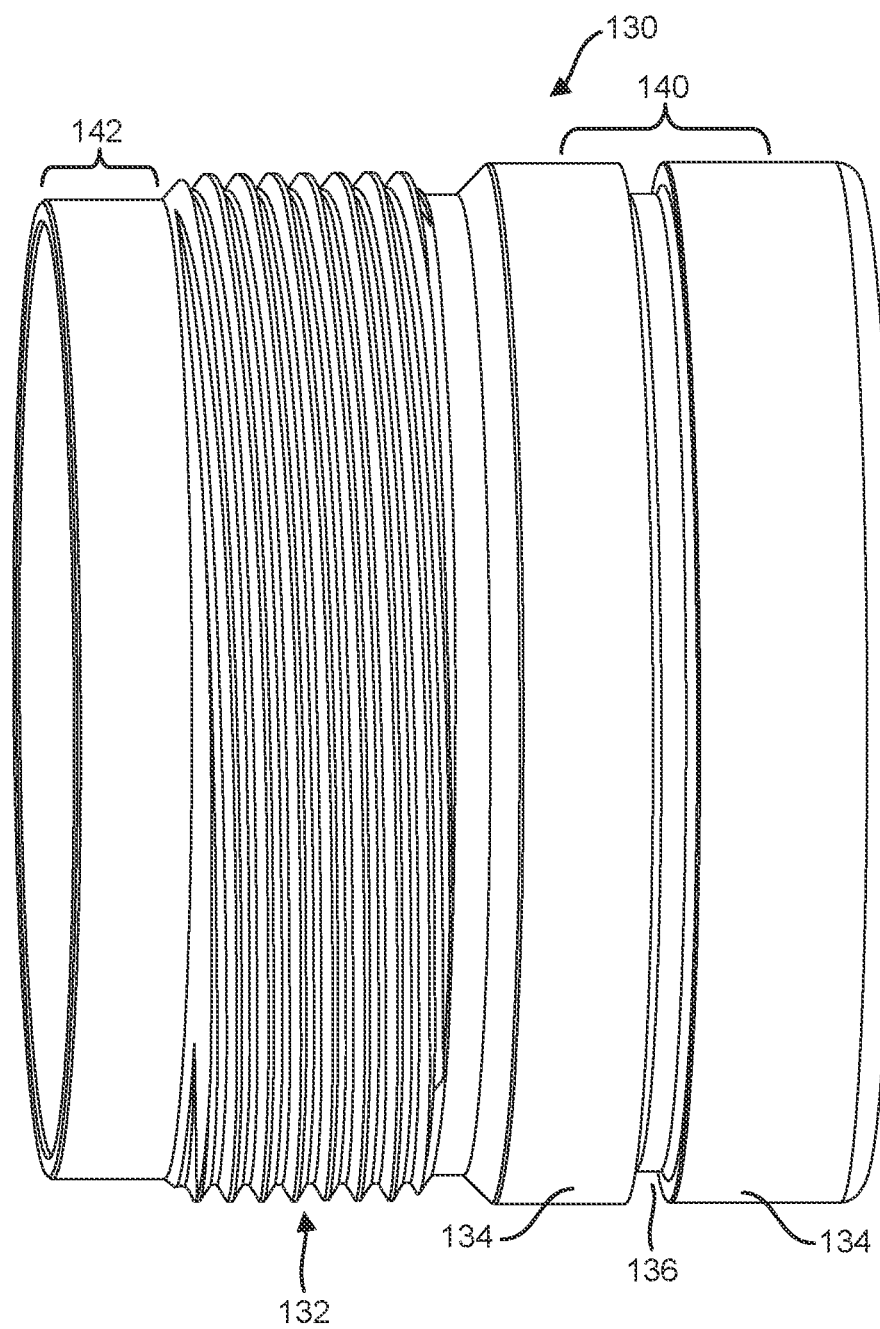
FIG. 15 illustrates a pictorial view of a collet ramp of the locking member.

Referring to FIG. 15, the collet ramp 130 may define the exterior set of threads 132 which are rotatably engaged with the threads 120 of the knob substrate 110. The exterior surface 134 of the collet ramp 130 defines a forward circular recess 136 that is sized to receive a forward O-ring 154 that is slightly larger in depth and/or width than the forward circular recess 136. The forward portion 140 of the collet ramp 130 preferably has a higher elevation than the rearward portion 142 of the collet ramp 130. The surface of the forward portion 140 serves both to allow for an O-ring groove and to add structural strength in the tripod leg section sub-assembly. The surface of the rearward portion 142 is preferably near co-radial with the forward circular recess 136, such that they form an inner half of seals for a pair of O-rings 150, 154, where the forward seal gets compressed from the outside diameter and the rearward seal gets compressed from the inner diameter. Also, preferably the surface of the rearward portion 142 is at substantially the same elevation as the surface of the forward circular recess 136.

The collet ramp 130 may be secured to the exterior surface of the leg segment 20B, such as using an adhesive, so that the collet ramp 130 is maintained in a fixed relationship with respect to the leg segment 20B.

The forward O-ring 154, which is deformable, forms a substantially waterproof seal between the collet ramp 130 and the knob substrate 110 thereby keeping water and other debris out of the locking mechanism 24 from above and thereby the leg assembly. With a relatively low compression and a relatively slow reciprocating motion permits a relatively soft durometer to be used for the forward O-ring 154, and thereby results in minimal perceivable drag on the twist action of the locking mechanism 24.

The back O-ring 150, which is deformable, forms a substantially waterproof seal between the collet ramp 130 and the knob substrate 110 thereby keeping water and other debris out of the locking mechanism 24 from below and internally, and thereby the leg assembly. With a relatively low compression and a relatively slow reciprocating motion permits a relatively soft durometer to be used for the back O-ring 150, and thereby results in minimal perceivable drag on the twist action of the locking mechanism 24.

With the pair of O-rings 150 and 154, one toward the forward portion of the locking mechanism 24 and one toward the back portion of the locking mechanism 24, the locking mechanism 24 forms a substantially waterproof seal between the collet ramp 130 and the knob substrate 110, even as the knob substrate 110 moves with respect to the collet ramp 130 and even as the leg segments 20A and 20B move with respect to one another.

The combination of the collet ramp 130 and the knob substrate 110 preferably define an open region 144 so that upon rotation of the knob substrate 110 with respect to the collet ramp 130, the knob substrate 110 slides based upon the threads in a direction in line with the leg segments 20A and 20B with respect to the collet ramp 130. While the knob substrate 110 slides with respect to the collet ramp 130 over its range of motion, the forward O-ring 154 and the back O-ring 150 both maintain the substantially waterproof seal.

Figure 16:
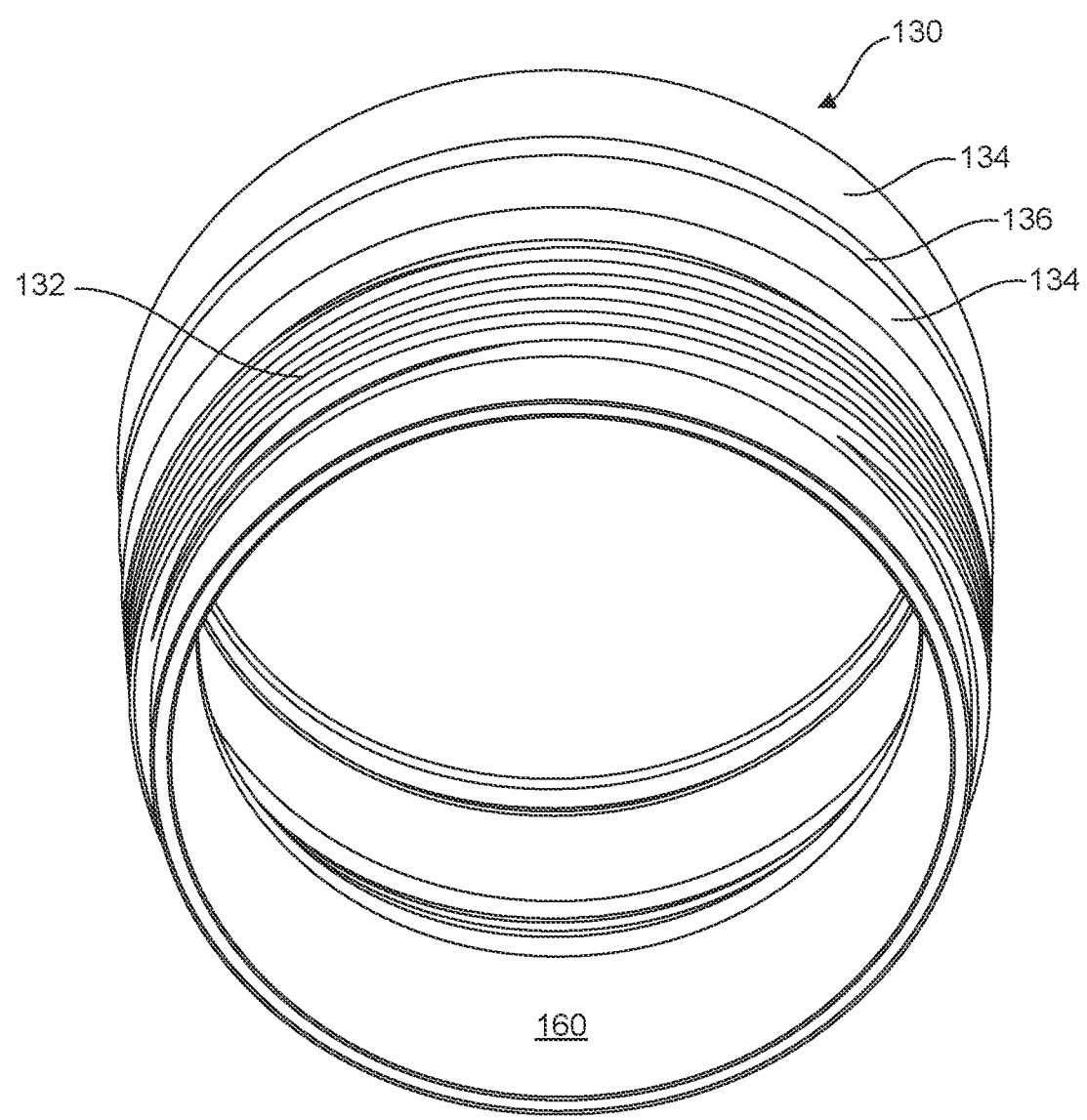
FIG. 16 illustrates another pictorial view of the collet ramp of the locking member.
Figure 17:
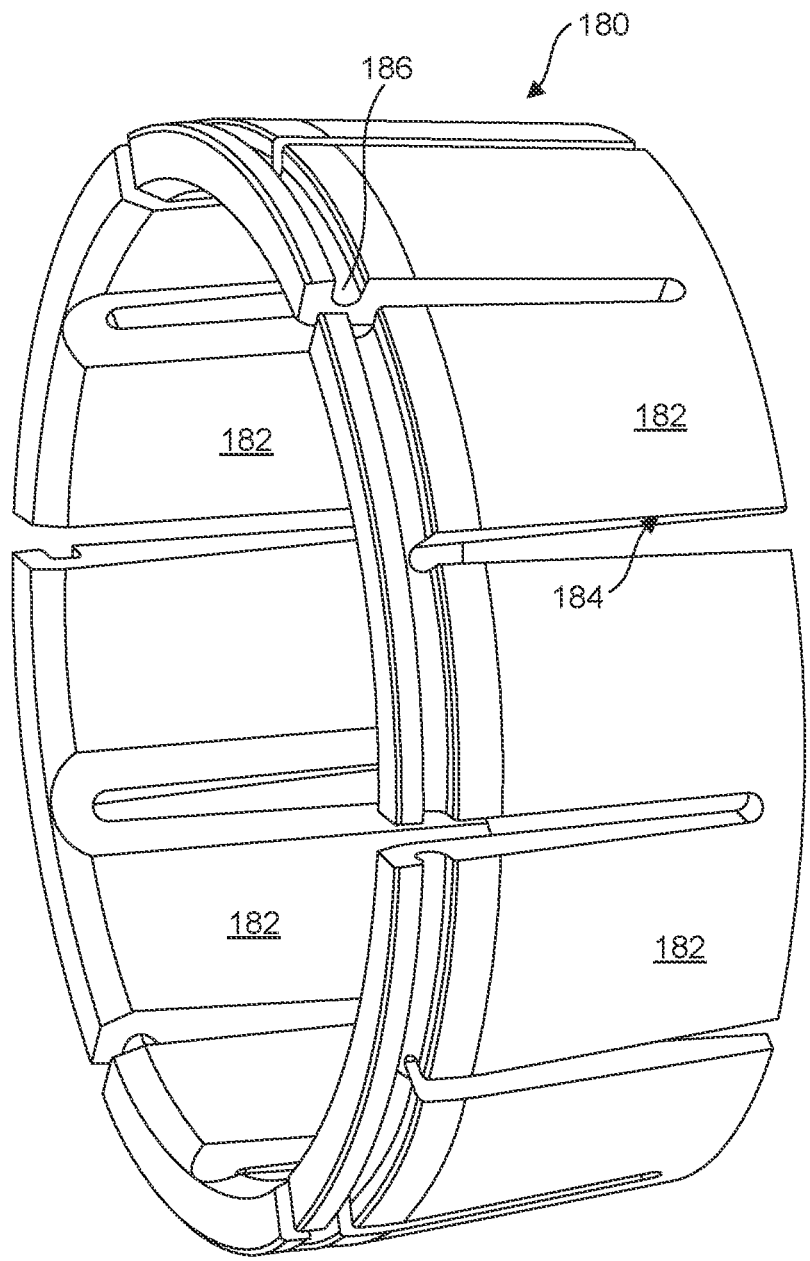
FIG. 17 illustrates a pictorial view of a collet lock of the locking member.

Referring also to FIG. 16, the collet ramp 130 includes a sloped surface 160 defined by the interior of the collet ramp 130. Referring to FIG. 17, a collet lock 180 may include a set of tapered fingers 182 that define a sloped surface 184. The slope of the sloped surface 184 of the tapered fingers 182 preferably substantially matches the slope of the sloped surface 160 of the collet ramp 130. Preferably, the sloped surface is between 5-10 degrees, and more preferably between 6-7 degrees, to provide for fast lock and unlock speeds, in a manner not likely to cause the locking member 24 to become stuck in the process. In this manner, the sloped surfaces 160 and 184 may slide with respect to one another with a face-to-face engagement. The collet lock 180 preferably includes a circular depression 186 that matches an exterior protrusion 188 of the knob substrate 110.

The collet lock 180 is maintained in a fixed relationship with respect to the knob substrate 110 with the circular depression 186 and the exterior protrusion 188. The collet ramp 130 is maintained in a fixed relationship with respect to the leg segment 20B. With the rotation of the knob tread 100, the knob substrate 110 rotates with respect to the collet ramp 130 and are moved axially based upon the threads in line with the leg segments 20A and 20B which selectively increases and decreases the pressure inhibiting movement of the leg segments 20A and 20B with respect to one another.

Figure 18:
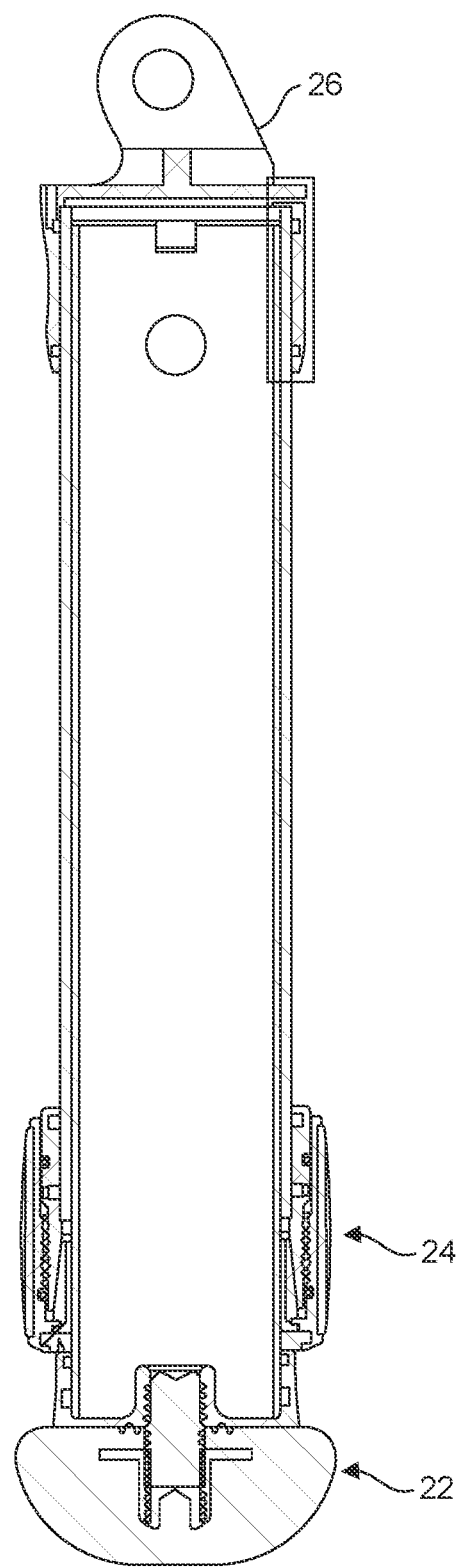
FIG. 18 illustrates a pictorial view of a collet lock of a pair of leg segments.

Referring to FIG. 18, a cross sectional view of a leg assembly is shown with the foot 22, the two leg segments 20A and 20B in a generally retracted position, the locking mechanism 24, and the yoke 26.

Figure 19:
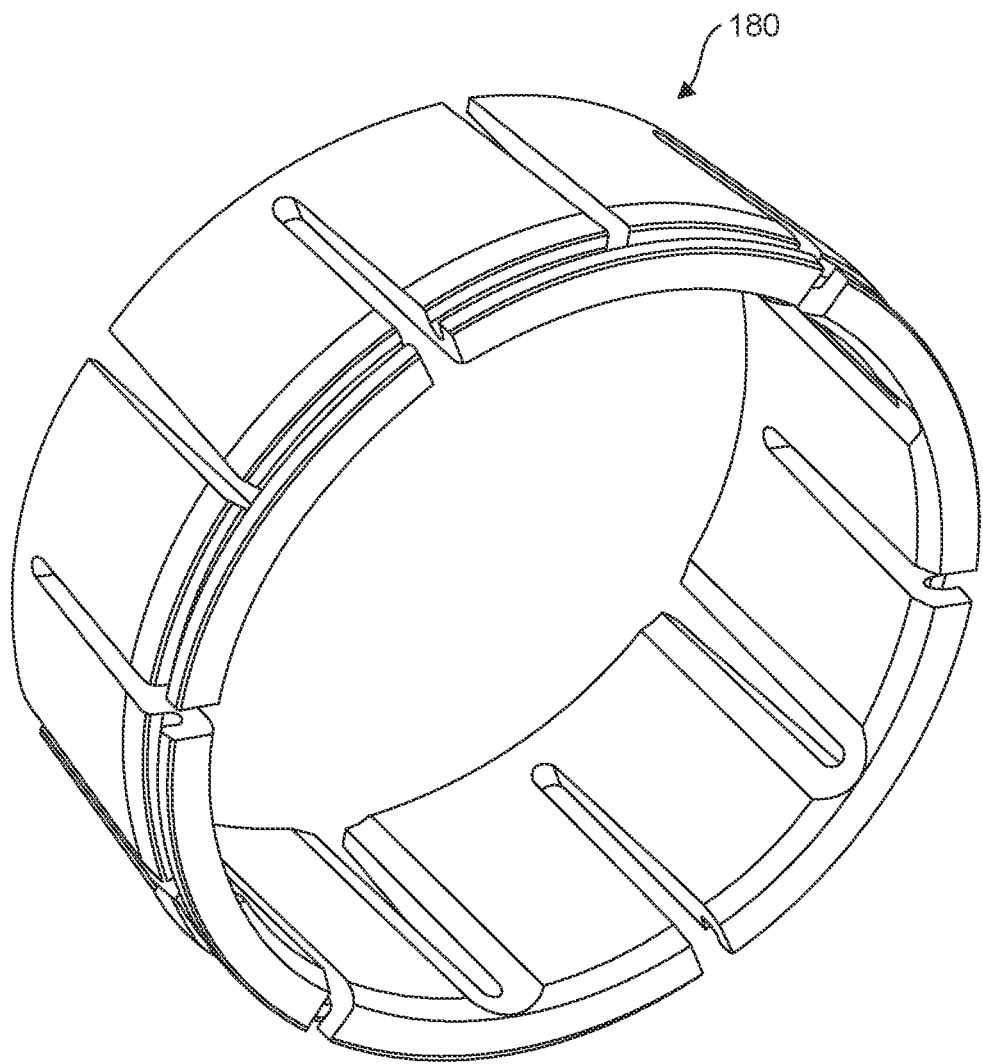
FIG. 19 illustrates a pictorial view of a collet lock of the locking member.
Figure 20:
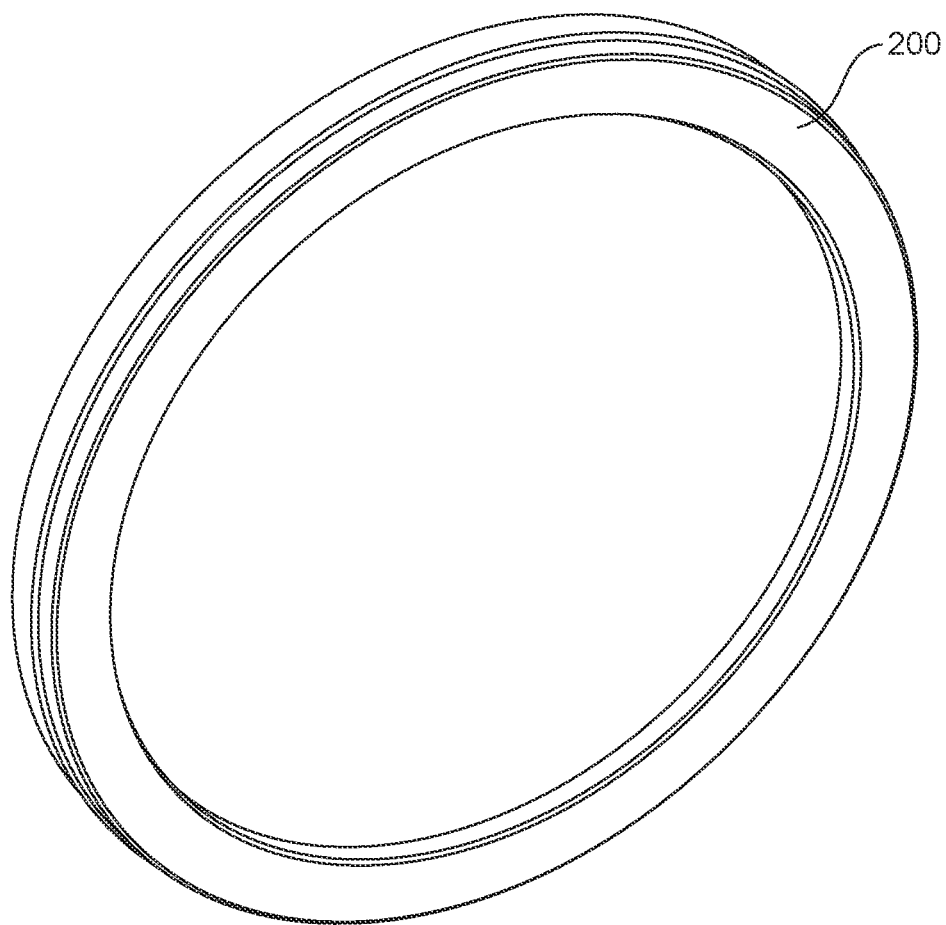
FIG. 20 illustrates a pictorial view of a circular ring of the locking member.
Figure 21:
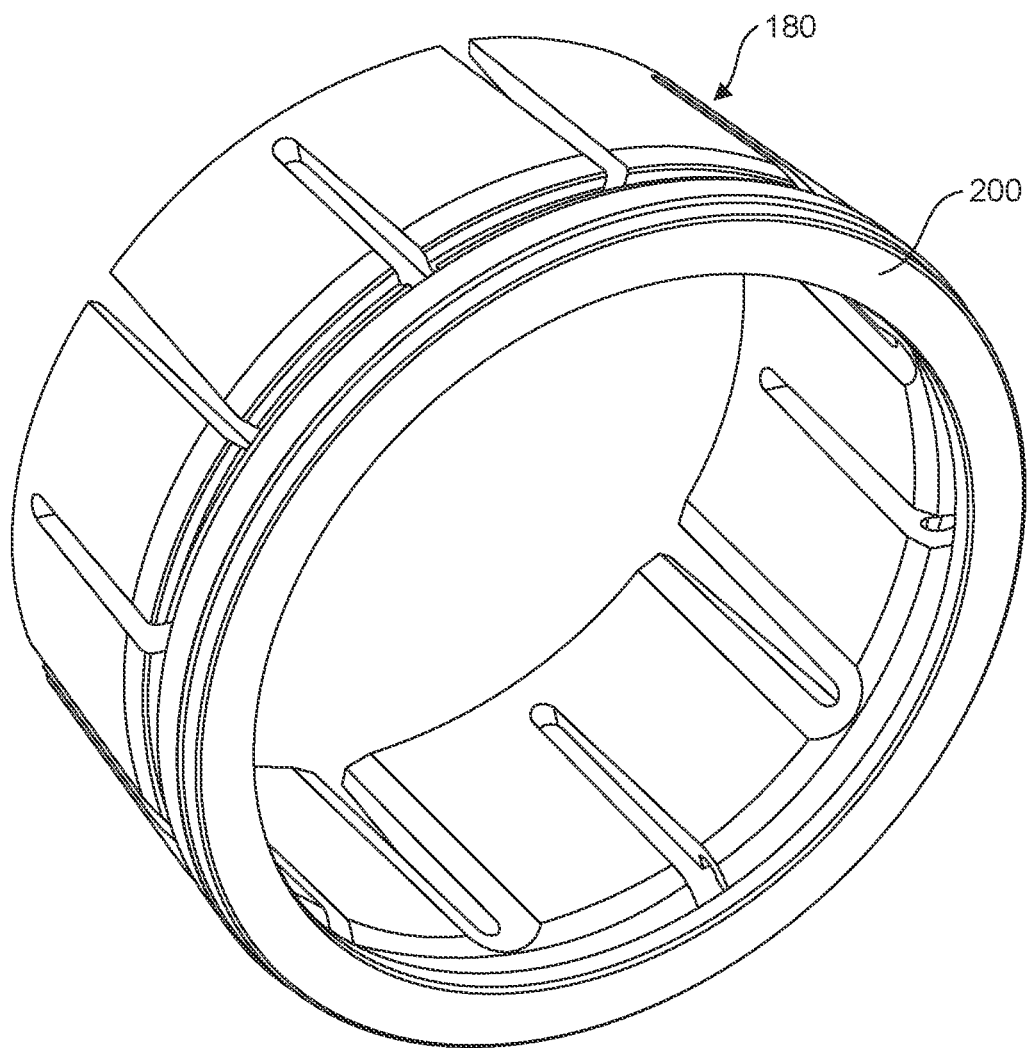
FIG. 21 illustrates a pictorial view of the collet lock and the circular ring of the locking member.
Figure 22:
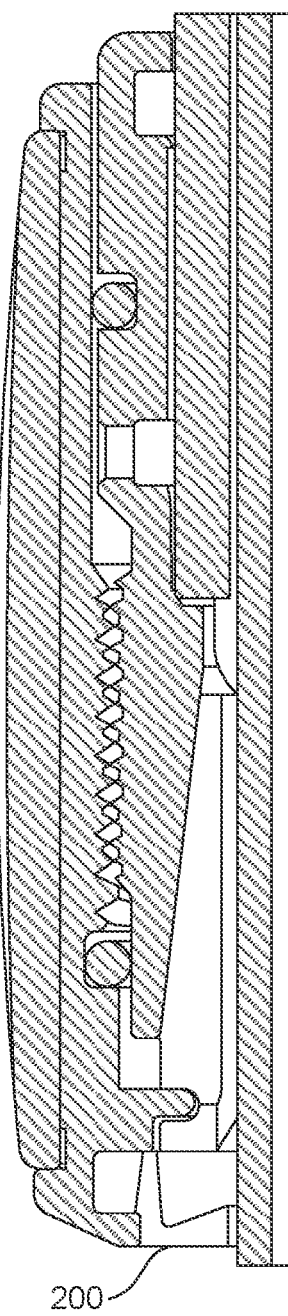
FIG. 22 illustrates a cross sectional view of another locking member.

Referring to FIG. 19, the collet lock 180 is illustrated, with a different view than the collet lock 180 illustrated in FIG. 17. To provide the capability of selectively keeping fluid and other particles out of the locking mechanism 24, it is desirable to include a blocking member, detachably engaged with the collet lock 180. Referring to FIG. 20, one type of blocking member is a circular ring 200 that snaps into the substrate 110 into the circular recess 122. Referring to FIG. 21, the circular ring 200 has an inside diameter that is slightly greater than the corresponding diameter of the leg segment 20A, so that it does not substantially rub on the exterior surface of the leg segment 20A providing for fast telescoping of the legs. In this manner, flowing fluid will tend to be mostly diverted away, and all but the smallest silty particles will be totally blocked. Referring to FIG. 22, a cross sectional view of a locking mechanism 24 together with the circular ring 200, is illustrated. The circular ring 200 is readily replaceable by the user.

Another type of blocking member is a circular ring 200 that snaps into the collet lock 180. The alternative circular ring 200 has an inside diameter that is substantially the same as the corresponding diameter of the leg segment 20A, so that it substantially rubs on the exterior surface of the leg segment 20A providing for substantially slower telescoping of the legs due to the increased resistance. In this manner, flowing fluid will tend to be almost all diverted away, and substantially all including substantially all of the smallest silty particles, will be totally blocked. The circular ring 200 is readily replaceable by the user.

Another type of blocking member is a v-shaped ring 210 (see FIG. 11) that snaps into the collet lock 180. The alternative v-shaped ring 210 has an inside diameter that is substantially the same as the corresponding diameter of the leg segment 20A, so that it substantially rubs on the exterior surface of the leg segment 20A providing for substantially slower telescoping of the legs due to the increased resistance. Moreover, the v-shaped cross-sectional tends to result in an externally directed force against the exterior of the leg segment 20A. In this manner, flowing fluid will tend to be almost all diverted away, and substantially all including substantially all of the smallest silty particles, will be totally blocked. The v-shaped ring 210 is readily replaceable by the user.

As previously described, there are two separate seal mechanisms that may be included, either of which may be omitted, if desired. Referring to FIG. 11, in general, the seals that include O-ring 150 and O-ring 154 inhibit contaminants from reaching the threaded members 130 and 132 and also inhibit the user from actuating the lock. The O-ring 154 is typically sufficient to substantially keep contaminants out of the mechanism without the need for the additional O-ring 150 if the v-shaped ring 210 inhibited all (or substantially all) contaminants from entering through the vent and/or the foot receiver. The O-ring 150 may be included as an additional fail safe in order to inhibit the threads from becoming fouled in the event that contamination enters through the vent, the foot receiver, or if the v-shaped ring 210 does not provide a sufficient seal (as is the case when using ring 200 of FIG. 20 instead of ring 210 of FIG. 11).

As previously described, the v-shaped ring 210 (see FIG. 11) and/or the v-shaped ring 200 (see FIG. 20) inhibit contaminants from reaching the collet (see, FIG. 11, element 180), anti-twist twist sleeves (see, FIG. 5, elements 32A and 32B), and getting stuck inside the inner tubes (see, FIG. 4, element 20A). In practice, the threads tend to limit the intrusion of contaminants from entering the tube assembly so that the O-ring 150 and the O-ring 154 may be omitted, especially if the v-shaped ring 210 is included. Over time, some contamination may pass through the threaded region but is substantially inhibited by grease included on the threads. By including a seal mechanism, this reduces fouling of the collet which can prevent the collet from collapsing on the tube and locking. In addition, by including a seal mechanism, this reduces particles from wedging between the collet and the tube, acting like little ball bearings thereby decreasing the locking friction. Further, by including a seal mechanism, this reduces fouling in other parts of the tube which may lead to trapped contaminants that leave foul odors or harden over time which inhibit full functionality.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A support suitable for supporting a device thereon comprising:
   (a) said support including three elongate hollow leg members supporting an apex, said apex defining a supporting surface suitable for supporting said device thereon;
   (b) each of said three elongate hollow leg members including respective a first leg segment and a second leg segment that are slidably movable relative to one another and wherein each of said three elongate hollow leg members includes a respective leg yoke at a respective terminal portion thereof;
   (c) a respective locking mechanism selectively inhibiting said slidably movable between said first and second leg segments for respective ones of said three elongate hollow leg members, wherein said respective locking mechanism is configured to provide a substantially waterproof seal using a first member engaged therein to inhibit liquid from reaching the interior of said first leg segment and said second leg segment for respective ones of said three elongate hollow leg members;
   (d) each of said locking mechanisms includes an upper structure with a first recess defined therein and said first member engaged therein, where said first member is resiliently deformable, where the depth of said first member is greater than the depth of said first recess, wherein said upper structure is proximate an upper end of said respective locking mechanism relative to a lower end of said respective locking mechanism, wherein said upper end of said respective locking mechanism is closer to said yoke than said lower end of said respective locking mechanism, wherein said first recess at least one of (i) opens up toward said at least one elongate hollow leg member and (ii) opens up away from said at least one elongate leg member, wherein locking said locking mechanism compresses said first member, wherein unlocking said locking mechanism decompresses said first member;
   (e) wherein each of said respective yokes defines a respective yoke opening therein that permits free-flow of air between an inside of each of respective said one of said three elongate hollow leg members and an exterior of respective said yoke when respective said first leg segment and said second leg segment are slidably moved relative to one another thereby changing the volume of space defined within respective ones of said three elongate hollow leg members;

(f) wherein each of said three elongate legs is rotatable in an arch relative to said apex such that each of said three elongate legs are rotatable outwardly in a manner such that said three elongate legs are only capable of supporting said apex at a position above respective terminal end portions of said three elongate legs in a manner such that said device is positioned at an elevation higher than any portion of said three elongate legs when said respective terminal end portions of each of respective said three elongate legs are positioned on the ground, where said respective terminal end portions are at an opposite end of each of respective said three elongate legs relative to said yolk, where when said respective terminal end portions of said three elongate legs are positioned on the ground and supporting said apex rising water levels relative to the ground first reach said lower end of a respective locking mechanism prior to reaching said upper end of said respective locking mechanism.

2. The support of claim 1 wherein each of said locking mechanisms said selectively inhibits respective said slidably movable by selective rotation.

3. The support of claim 1 wherein each of said three elongate hollow leg members is rotatably connected to said apex, a respective slidable tab operationally engaged with said support to selectively inhibit respective said rotatably connected between each of said three hollow leg members and said apex.

4. The support of claim 1 wherein each of said yokes further comprising at least one sleeve portion that is engaged in face-to-face abutment between an exterior surface of said at least one sleeve portion and an interior surface of respective said elongate hollow leg member to inhibit rotation of respective said yoke with respect to respective said elongate hollow leg member.

5. The support of claim 4 wherein respective said exterior surface of said at least one of said sleeve portion includes a pair of spaced apart recessed portions.

6. The support of claim 1 wherein each of said elongate hollow leg members is rotatably connected to said apex, a respective slidable tab operationally engaged with said support to selectively inhibit said rotatably connected between respective said elongate hollow leg member and said apex, respective said yoke opening oriented in a direction away from respective said slidable tab.

7. The support of claim 1 wherein each of said elongate hollow leg members includes a respective foot assembly at a terminal portion thereof, respective said foot assembly includes a respective foot portion that is suitable for supporting said support on a ground, respective said foot assembly includes a respective receiver portion engaged with a respective surface of respective said elongate hollow leg member, a respective tee nut together with a respective set screw detachably engaging respective said foot portion with respective said receiver portion in such a manner that when respective said foot portion is engaged with respective said receiver portion water is inhibited from entering respective said elongate hollow leg member from a location proximate with respective said foot assembly.

8. The support of claim 1 wherein one of said locking mechanism includes a knob tread with an exterior surface that defines an exterior set of raised ribs and an interior surface that is in face-to-face engagement with a knurled surface.

9. The support of claim 1 wherein one of said locking mechanism includes a knob substrate that includes an exterior surface that defines a pair of grooves and an interior surface that defines a set of knob substrate threads.

10. The support of claim 9 further comprising said one of said locking mechanism includes a collet ramp that defines a set of collet ramp threads that are rotatably engaged with said knob substrate threads.

11. The support of claim 10 further comprising said interior surface of said knob substrate defining at least one of said first recess and said second recess.

12. The support of claim 10 further comprising said collet ramp defining the other one of said first recess and said second recess.

13. The support of claim 11 further comprising said collet ramp defining the other one of said first recess and said second recess, a second resiliently deformable member maintained within the other one of said first recess and said second recess.

14. The support of claim 10 further comprising an interior surface of a collet lock defines a collet lock sloped surface where said collet lock is positioned at a location interior to said collet ramp.

15. The support of claim 14 wherein said collet lock sloped surface is defined by a plurality of sloped fingers.

16. The support of claim 14 wherein said collet lock sloped surface is substantially the same slope of said collet ramp.

17. The support of claim 16 wherein said collet lock is maintained in a fixed position with respect to said knob substrate, such that rotation of said knob substrate results in matching rotation of said collet lock.

18. The support of claim 17 further comprising a block member that is detachably engageable with said collet lock to inhibit fluid from reaching a junction of said first leg segment and said second leg segment.

19. The support of claim 1 wherein said yolk includes a latching mechanism to selectively position one of said elongate legs in a selected orientation.

* * * * *